United States Patent [19]

Shibata

[11] 4,171,729
[45] Oct. 23, 1979

[54] COOLANT CIRCULATING SYSTEM FOR MOTORCYCLE

[75] Inventor: Hirotaka Shibata, Hamamatsu, Japan

[73] Assignee: Yamaha Hatsudoki Kabushiki Kaisha, Iwata, Japan

[21] Appl. No.: 800,809

[22] Filed: May 26, 1977

[30] Foreign Application Priority Data

Jun. 7, 1976 [JP] Japan .................................. 51-66318

[51] Int. Cl.² ...................... B60K 11/04; B62K 11/00
[52] U.S. Cl. ..................................... 180/229; 165/41; 180/68 R
[58] Field of Search ..................... 180/33 R, 68 R, 31; 165/41, 51, 86

[56] References Cited

U.S. PATENT DOCUMENTS

| 1,858,743 | 5/1932 | Langstreth | 180/33 R |
| 2,781,859 | 2/1957 | Warren | 180/33 R |
| 3,612,204 | 10/1971 | Allen | 180/43 R |
| 4,016,945 | 4/1977 | Shibata | 180/33 R |
| 4,019,595 | 4/1977 | Imai et al. | 180/33 R |
| 4,066,119 | 1/1978 | Stedman | 165/41 |

FOREIGN PATENT DOCUMENTS 18911 of 1914 United Kingdom ..................... 165/41

Primary Examiner—Joseph F. Peters, Jr.
Assistant Examiner—Michael Mar
Attorney, Agent, or Firm—Donald D. Mon

[57] ABSTRACT

A coolant circulating system for a motorcycle having a liquid cooled engine. The system includes a radiator mounted to the front fork, an engine mounted to the frame, pipes from the engine, pipes from the radiator, and a fluid conducting, two-channel swivel connector on the steering shaft to enable the radiator and engine to be interconnected without requiring flexure of the pipes. Preferably the swivel connector is a body separate from and attachable to the steering shaft.

9 Claims, 7 Drawing Figures

COOLANT CIRCULATING SYSTEM FOR MOTORCYCLE

The present invention relates to a cooling water circulating system for motorcycles and, more particularly, to a system for circulating coolant water through a water-cooled engine mounted on a frame of a motorcycle and a radiator mounted on a front fork of the motorcycle.

In motorcycles having a water-cooled engine mounted on a frame and a radiator provided on a front fork, the radiator is rotated unitarily with the steering handle, so that the relative position of the radiator to the engine is changed when the direction of travel is changed.

Conventionally, this change in position is absorbed by a flexible hose provided between the engine and the radiator. In this way of solution, the hose is deformed for each time of steering operation, so that the hose is likely to be damaged due to fatigue. In addition, the resilient nature of the hose is apt to hinder the smooth operation of the steering handle.

An object of the present invention is to provide an improved coolant circulating system for a motorcycle which does not affect the steering operation, while maintaining a cooling water passage between the engine and the radiator, and which can be easily assembled and disassembled ensuring easy inspection and maintenance, without requiring the disassembling of precisely assembled and adjusted portion such as the steering handle.

In applicant's U.S. Pat. No. 4,016,945, issued Apr. 12, 1977 on an application filed Mar. 3, 1976, Ser. No. 663,441, assigned to the same assignee as this instant patent application, there is disclosed a means to interconnect a similarly mounted engine and radiator, but the connection is made in the structural parts of the steering head. This invention provides an "add-on" feature, which enables this invention to be utilized without modification of the basic motorcycle structure.

This invention includes a liquid cooled engine, a radiator, inlet and outlet pipes, from each of them, and a two-channel swivel connector means on the steering shaft interconnecting the radiator and the engine.

According to a preferred feature of the invention, the swivel connector means is a separate body attached to said steering shaft.

The above and other features of this invention will be fully understood from the following detailed description and the accompanying drawings, in which.

Figure 1:
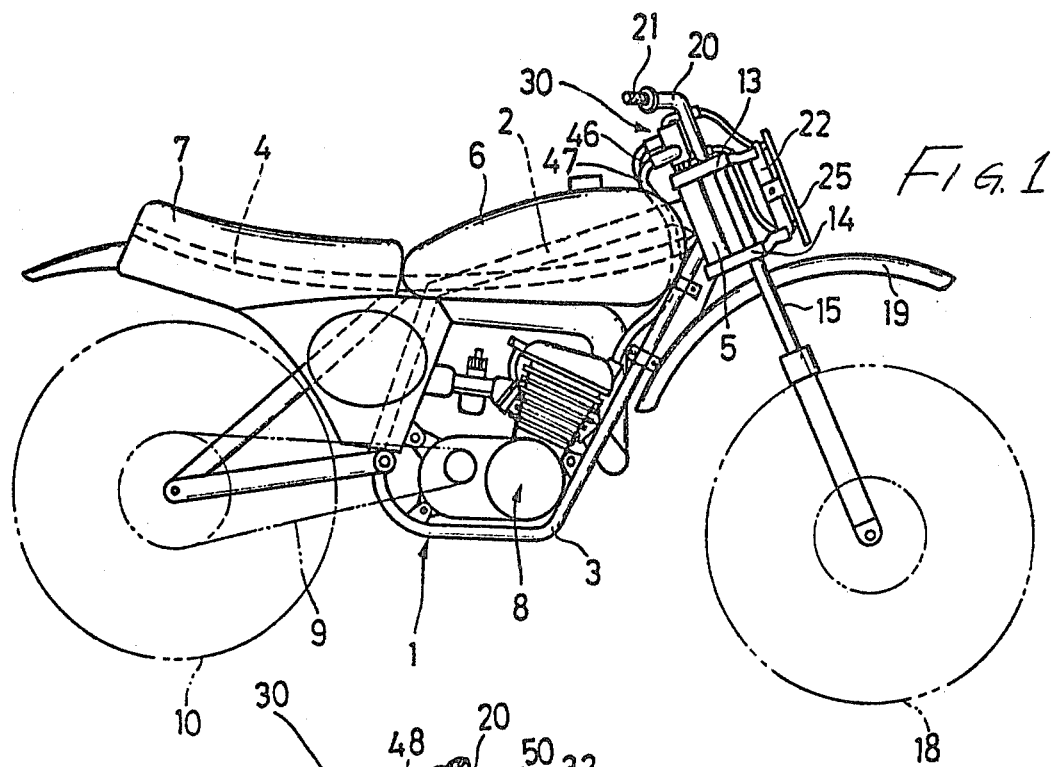
FIG. 1 is a schematic side elevational view of a motorcycle incorporating the preferred embodiment of the invention.
Figure 2:
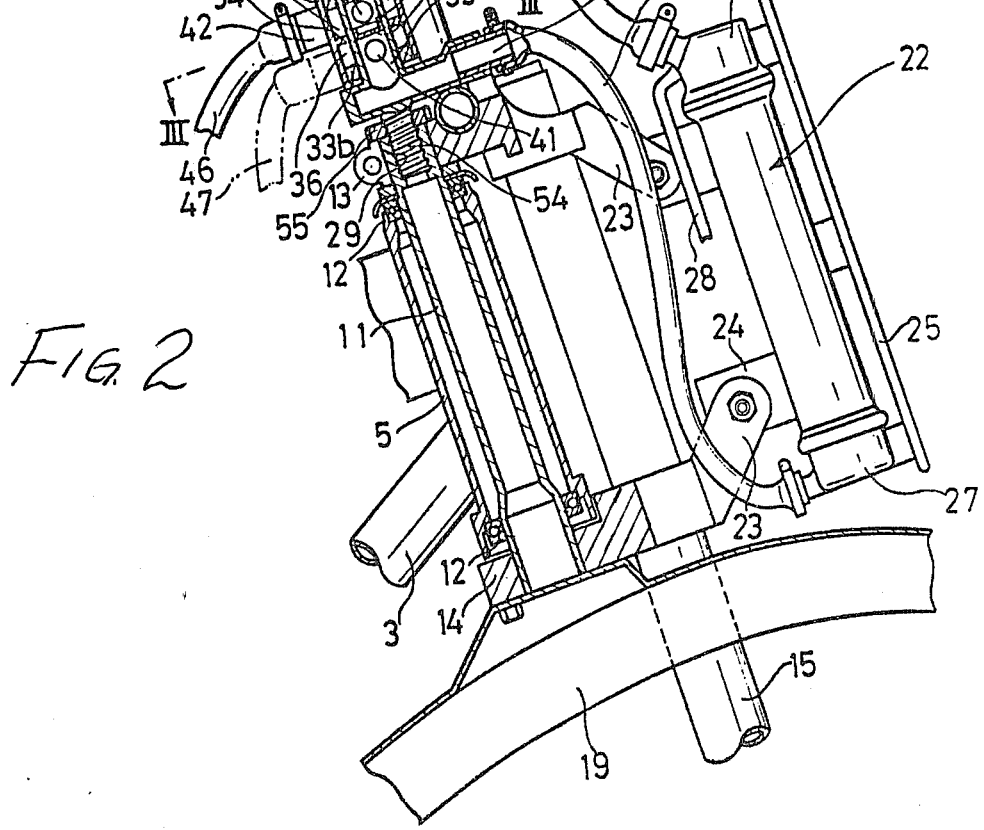
FIG. 2 is an enlarged sectional view of part of the motorcycle of FIG. 1.
Figure 3:
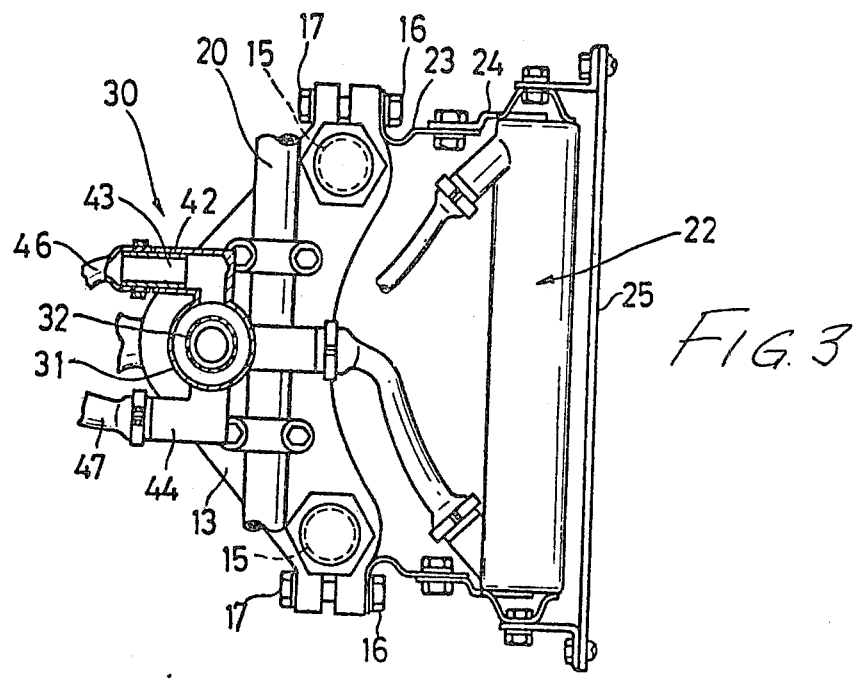
FIG. 3 is a sectional view taken along the line 3—3 of FIG. 2.

Referring to FIGS. 1 to 3, a frame 1 of a motorcycle is a welded construction of a steering head pipe 5 and a main pipe 2 welded to the steering head pipe 5, down tube 3, and a seat rail 4. A fuel tank 6 is provided on the main pipe 2 straddling the latter. Behind the fuel tank 6, a seal 7 is mounted on the seat rail 4. The water-cooled engine is supported by the main pipe 2 and the down tube 3. The driving force exerted by the engine is transmitted to a rear wheel 10, through a clutch and a transmission which are not shown, and through a chain 9.

A steering shaft 11 passes through the steering head pipe 5, along the axis line of the latter, and is rotatably supported by bearings 12, 12. Upper and lower brackets which have V-shaped planes 13, 14 are fixed to the steering shaft 11, at the upper and the lower ends of the latter 11. A front fork 15 is unitarily secured to the front ends of the upper and the lower brackets 13, 14, by means of bolt 16 and nut 17, forming a pair. The front fork has its lower end extended forwardly rotatably to support a front wheel 18. Numeral 19 designates a front fender. A steering handle 20 is fixed to the upper bracket 13. Conventional manually operative members such as an accelerator grip 21 and a clutch lever (not shown) are secured to the steering handle 20.

As the handle 20 is steered from side to side, the steering shaft 11 is rotated around the axis line of the steering head pipe 5. Accordingly, the front fork 15 is rotated unitarily with the steering shaft 11, through the upper and under brackets 13, 14, along with the front wheel 18 and the front fender 19.

A radiator is mounted to the front fork above the front fender 19. More specifically, at the front ends of the upper and the under brackets 13, 14, supports 23 are secured by means of aforementioned bolt 16 and nut 17 for securing the front fork 15. Stays 24 welded to the radiator 22 are fastened to the supports 23 by means of bolts, thereby to mount the radiator 22 to the brackets 13 and 14.

Numeral 25 denotes a number plate on which the entry number of the motorcycle is carried, when the motorcycle participates in a race. The number plate 25 is made of an air permeable material, for example, a gauze wire or punched metal. It also serves to protect the radiator 22. Numerals 26 and 27 denote an upper and a lower water tank for the radiator 22, while numeral 28 denotes an over-flow pipe.

Two-channel swivel connector means 30 is detachable secured to a threaded bore 29 formed at the upper end of the steering shaft 11. The connector means 30 includes an outer and an inner pipe 31 and 32. The inner pipe and the outer pipe 31, 32 are rotatable relative to each other, with inner pipe 32 lying on the axis line of outer pipe 31. Outer pipe 31 is sealed liquid-tight at its upper and lower ends by means of upper and lower water seals 33a and 33b. A partition wall 34 is provided at an axially intermediate portion of the outer pipe 31, and thereby defines a water inlet chamber 35 and a water outlet chamber 36, between the outer and the inner pipes 31 and 32.

A partition wall 37 is provided at an axial intermediate portion of the inner pipe 32 to define in the upward and downward direction a water inlet passage 38 and a water outlet passage 39. The water inlet chamber 35 and the water inlet passage 38 are in communication with each other through a bore 40 formed in the upper portion of the wall of the inner pipe 32, while the water outlet chamber 36 and the water outlet passage 39 are in communication with each other through a bore 41 formed in the lower portion of the wall of the inner pipe 32. These communications are maintained regardless of the relative rotation of the inner and the outer pipes.

At the upper portion of the wall of the outer pipe 31, a connection pipe 42 is provided to project laterally thereof. The connection pipe 42 has an inlet port 43 which opens rearwardly. At the lower portion of the wall of the outer pipe 31, a connection pipe 44 is provided which extends in the opposite direction to the first mentioned connection pipe 41. The connection pipe 44 is provided with an outlet port (not shown) which opens also rearwardly. Inlet and outlet hoses 46 and 47 are connected at their one end to the connection pipes 41 and 44, respectively.

The other end of the inlet hose 46 is connected to a water outlet of a water jacket (not shown) of the engine 8, while the outlet hose 47 is connected at its other end to a water inlet port of the water jacket (not shown) of the engine through a water pump which is omitted from the drawings.

A connection pipe 48 is screwed to the upper end of the inner pipe 32, and is fastened thereto by means of a nut 49. Connection pipe 48 has a water outlet pipe 50 which opens forwardly. A water inlet port 51 is formed at the end of a forwardly bent lower end of the inner pipe 32. A water outlet hose 52 is connected at one of its ends to the outlet port 50 of the connection pipe 48, and to the upper water tank 26 of the radiator 22 at its other end.

A water inlet hose 53 has one of its ends connected to the inlet port 51 of the inner pipe 32, and its other end connected to the lower water tank 27 of the radiator 22.

Consequently, the water flows from the engine 8 to the radiator 22, through the inlet hose 46, water inlet chamber 35 of the outer pipe 31, water inlet passage 38 of the inner pipe 32, connection pipe 48, and water outlet hose 52. After having been cooled in the radiator 22, the water is returned to the engine 8 through the inlet hose 53, water outlet passage 39 of the inner pipe 32, water outlet chamber 36 of the outer pipe 31, and the water outlet hose 47.

A threaded rod 54 is formed to project from the lower end of the inner pipe 32, on the axis line of the latter, and is adapted for a detachable screwing engagement with the threaded bore 29 on the steering shaft 11, and to be secured thereto by means of a nut 55. Thus, the connector means 30 is a separate body that is detachably secured to steering shaft 11 by threaded rod 54.

In use, the connector means is mounted as aforesaid to the steering shaft 11. The inlet and outlet hoses 46, 47 extending from the engine 8 are connected, as mentioned before, to the inlet and the outlet chambers 35, 36 respectively, while the outlet and the inlet hoses 52, 53 extending from the radiator 22 are connected to the inlet and the outlet passages 38, 39 of the inner pipe 32, to complete the circuit for the cooling water.

The cooling water heated in the engine is cooled as it passes through the radiator 22, and is then returned to the engine for cooling the latter 8.

As the steering handle 20 is turned from side to side, the steering shaft 11, front fork 15 and the radiator 22 are rotated as a unit. The inner pipe 32 of the connector means 30 rotates with steering shaft 11. Therefore, the position of the radiator 22 relative to the inner pipe 32 is not changed, despite the rotation of the steering handle 20, so that the hoses extending therebetween are not subjected to any force which would cause deformation of these hoses.

On the other hand, the outer pipe 31, which is rotatable with respect to the inner pipe 32, is prevented from being rotated, by the hoses 46, 47 extending from the engine 8, so that no change is caused of the relative positions of the outer pipe 31 and the engine 8. No deformation of the hoses 46, 47 extending from the engine 8 therefore takes place. The hoses themselves therefore act as a restraint against rotation of outer pipe 32, the same as if the outer pipe were connected to any part of the frame or engine.

Thus, the inner pipe 32 is rotated as the steering handle 20 is rotated, while the outer pipe 31 is restrained against rotation. However, the communications between the water chambers 36, 37 of the outer pipe 31 and the water passages 38, 39 of the inner pipe 31, respectively, are maintained regardless of the relative rotation of the pipes, through the bores 40, 41 formed in the wall of the inner pipe 32, so as to ensure a constant flow of coolant through the cooling water circuit.

It will be understood that the operation of the steering handle 20 is not resisted by the resilience of the flexible hoses, which has occurred in conventional systems. Although a small resistance to rotation of the pipes 31 and 32 may be exerted by the viscosity of the water, such a resistance is negligibly small and does not materially affect the smooth operation of the steering handle 20.

In addition, it is advantageous that the above stated connector means 30 as a unit can be attached to the steering shaft 11 which itself must be assembled with a high precision, without requiring a modification of the steering shaft 11. The connector means 30 as a unit can conveniently be secured to the steering shaft 11 of commercially available motorcycles of this type, in place of the bolt at the upper end of the steering shaft 11.

The unitary construction of the connector means facilitates the inspection, maintenance and assembling thereof.

Radiator 22 provided on the front fork 15 is directed against the wind as the motorcycle is steered by the handle, to greatly enhance the cooling efficiency which in turn allows the radiator to be made light and compact.

Figure 4:
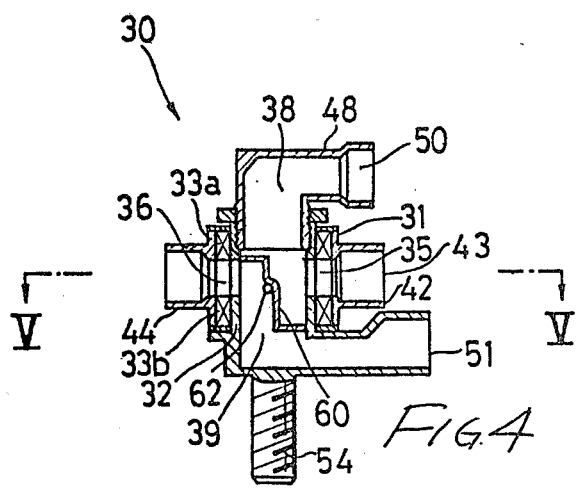
FIG. 4 is a sectional view of another embodiment of connector means.
Figure 5:
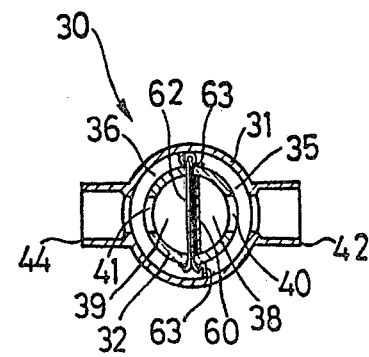
FIG. 5 is a sectional view taken along the line 5—5 of FIG. 4.
Figure 6:
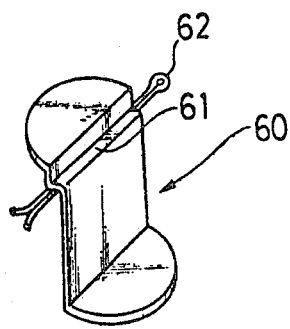
FIG. 6 is a perspective view of a partition plate.

In the described embodiment, the water chambers and passages are divided, respectively, in the vertical direction. However, these chambers and passages may be divided, respectively, in the lateral direction, as shown in FIGS. 4 through 6. In these Figures, numeral 60 designates a partition wall. The partition wall 60 is generally Z-shaped, as shown in FIG. 6, and has an intermediate stepped portion 61. As shown in FIG. 4, the partition wall 60 is inserted into the inner pipe 32 and is prevented from being rotated by a cotter pin 62 which is provided across the inner pipe 32 and engages the stepped portion 61, as well as from being moved up and down. The upward movement is limited by the lower end of the connecting pipe 48. The cotter pin 62 extends between the outer and the inner pipes, passing through L-sectioned partition plates 63, 63, as shown in FIG. 5, and is secured thereto, so as to unitarily hold the partition plates 63, 63.

Consequently, the space in the outer pipe 31 is laterally divided, by the partition plates 63, 63, into the water inlet chamber 35 and a water outlet chamber 36, while the space within the inner pipe 32 is also laterally divided into a water inlet passage 38 and a water outlet passage 39, by means of the partition plate 60.

It will be seen that this arrangement requires a smaller height of the connector means 30 as a whole, and renders it compact enough so as not to diminish the appearance of the vehicle when the connector means 30 are secured to the upper end of the steering shaft 11.

Figure 7:
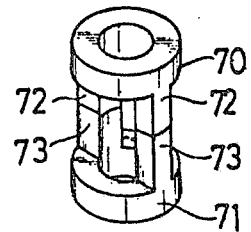
FIG. 7 is a perspective view of a water seal of still another embodiment of the invention.

For laterally separating the water chambers 35 and 36 from each other, the upper water seal 70 and the lower water seal 71 may have projections 72, 72 and 73, 73 which abut each other when brought to oppose each other, thereby to constitute partition walls, as shown in FIG. 7.

As has been described, according to the invention, connector means are composed of an outer pipe and an inner pipe rotatable on the axis line of the outer pipe, water chambers formed between the outer and the inner pipes and water passages formed in the inner pipe for communication of the water chambers with the radiator. The connector means are mounted on a motorcycle such that inner shaft is detachably secured to the steering shaft of the motorcycle with their axis lines aligning with each other.

Therefore, the mechanism for allowing the relative rotation of the steering head pipe and the steering shaft and the mechanism for allowing the relative rotation of the inner and the outer pipes are brought in alignment with each other to ensure a constant communication between the water passages and chambers of the inner and outer pipes. Accordingly, even when the radiator and the engine are displaced relatively to each other, as a result of the steering by the handle, the hoses extending from the radiator and the engine are not subjected to deformation, since the communication through the cooling water circuit can be maintained through the relative rotation of the inner and the outer pipes.

Thanks to the feature as explained above, the handle can be smoothly operated, without encountering resistance caused by the flexible and resilient nature of the hoses, in contrast to the conventional arrangement.

In addition, the connection between the water chambers and water passages is fairly maintained, regardless of the relative rotation of the inner and the outer pipes, so that a stable cooling of the engine is ensured without suffering an interruption of the cooling water circuit.

At the same time, the connector means 30 as a unit can be detachably secured to the steering shaft, without modifying conventional structure, especially the steering head pipe which must be assembled at an enhanced precision, even on existing motorcycles.

The detachable nature of the connector means 30 renders the inspection and the maintenance of the cooling system easy.

This invention is not to be limited by the embodiments shown in the drawings and described in the description which are given by way of example and not of limitation, but only in accordance with the scope of the appended claims.

I claim:

1. A cooling water circulating system for a motorcycle of the type which carries a water-cooled engine mounted on a motorcycle frame, a steering shaft rotatably mounted to said frame, and a front fork mounted to said steering shaft and rotatable around the axis of said steering shaft, said system comprising: a radiator mountable to said front fork; inlet and outlet coolant pipes from the engine and from the radiator; and a two-channel swivel connector means adapted to provide two-channel continuous coolant passages from the engine to the radiator and return at all rotary positions of the front fork relative to the frame, said connector means comprising a body separate from said steering shaft, frame and fork; and means for detachably attaching said swivel connector means to said steering shaft without disassembly of the steering shaft, frame, or fork.

2. A system according to claim 1 in which the connector means includes a pair of separate chambers for flow therethrough between the two pipes of each pair of pipes, said chambers being disposed one above the other relative to the axis of the steering shaft.

3. A system according to claim 1 in which the connector means includes a pair of separate chambers for flow therethrough between the two pipes of each pair of pipes, said chambers being disposed laterally adjacent to one another relative to the axis of the steering shaft.

4. A system according to claim 1 in which said connector means includes an inner tube, and an outer tube, said tubes being concentrically rotatable relative to one another, each of said pipes providing means for communication with two tubes.

5. A system according to claim 4 in which the connector means includes a pair of separate chambers for flow therethrough between the two pipes of each pair of pipes, said chambers being disposed one above the other relative to the axis of the steering shaft.

6. A system according to claim 4 in which the connector means includes a pair of separate chambers for flow therethrough between the two pipes of each pair of pipes, said chambers being disposed laterally adjacent to one another relative to the axis of the steering shaft.

7. In combination: a motorcycle of the type which carries a water-cooled engine mounted on a motorcycle frame, a steering shaft rotatably mounted to said frame, and a front fork mounted to said steering shaft and rotatable around the axis of said steering shaft; and a cooling water circulating system for said engine comprising: a radiator mounted to said front fork; inlet and outlet coolant pipes from the engine and from the radiator; a two-channel swivel connector means detachably attached to said steering shaft and to said pipes, and constituting a body separate from said steering shaft, frame, and fork whereby to provide two-channel continuous coolant passage from the engine to the radiator and return at all rotary positions of the front fork relative to the frame; and means for detachably attaching said swivel connector means to said steering shaft without disassembly of the steering shaft, frame, or fork.

8. A combination according to claim 7 in which the connector means includes a pair of separate chambers for flow therethrough between the two pipes of each pair of pipes, said chambers being disposed one above the other relative to the axis of the steering shaft.

9. A combination according to claim 7 in which the connector means includes a pair of separate chambers for flow therethrough between the two pipes of each pair of pipes, said chambers being disposed laterally adjacent to one another realtive to the axis of the steering shaft.

* * * * *